(12) United States Patent
Anderson et al.

(10) Patent No.: US 8,181,180 B1
(45) Date of Patent: May 15, 2012

(54) MANAGING JOBS IN SHARED FILE SYSTEMS

(75) Inventors: Eric A. Anderson, Palo Alto, CA (US); Christopher Edward Hoover, Los Gatos, CA (US); Charles E. Christian, Jr., Basking Ridge, NJ (US); Tim Reddin, Galway (IE); Robert J. Souza, Windham, NH (US); Xiaozhou Li, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1278 days.

(21) Appl. No.: 11/855,682

(22) Filed: Sep. 14, 2007

(51) Int. Cl.
*G06F 9/46* (2006.01)
(52) U.S. Cl. .................... 718/102; 714/38.1
(58) Field of Classification Search .............. 718/102; 714/38.1
See application file for complete search history.

(56) References Cited

U.S. PATENT DOCUMENTS

| | | | | |
|---|---|---|---|---|
| 5,247,684 A * | 9/1993 | Tavares et al. | ............ | 1/1 |
| 5,634,120 A * | 5/1997 | Nagasuka et al. | ............ | 708/9 |
| 5,872,970 A * | 2/1999 | Pickett et al. | ............ | 718/101 |
| 5,940,839 A * | 8/1999 | Chen et al. | ............ | 1/1 |
| 6,076,183 A * | 6/2000 | Espie et al. | ............ | 714/764 |
| 6,199,171 B1 * | 3/2001 | Bossen et al. | ............ | 714/2 |
| 6,715,008 B2 * | 3/2004 | Shimizu | ............ | 710/56 |
| 6,728,716 B1 * | 4/2004 | Bhattacharya et al. | ............ | 1/1 |
| 7,003,702 B2 * | 2/2006 | Budd et al. | ............ | 714/52 |
| 7,062,484 B2 * | 6/2006 | Pass | ............ | 455/3.04 |
| 7,155,577 B1 * | 12/2006 | Kiselev et al. | ............ | 711/141 |
| 7,209,934 B2 * | 4/2007 | Atchison | ............ | 1/1 |
| 7,464,124 B2 * | 12/2008 | McBride et al. | ............ | 1/1 |
| 7,552,358 B1 * | 6/2009 | Asgar-Deen et al. | ............ | 714/6 |
| 7,788,314 B2 * | 8/2010 | Holt | ............ | 709/201 |
| 2005/0120160 A1 * | 6/2005 | Plouffe et al. | ............ | 711/1 |

* cited by examiner

*Primary Examiner* — Jennifer To
*Assistant Examiner* — Wissam Rashid

(57) ABSTRACT

Embodiments include methods, apparatus, and systems for managing jobs in a shared file system. One embodiment includes a method that intercepts file accesses within a job on a client to a storage device in a shared file system, detects when a file associated with the job changes, and sends the client a message of the change.

12 Claims, 3 Drawing Sheets

MANAGING JOBS IN SHARED FILE SYSTEMS

BACKGROUND

Storage systems store large volumes of data. In a batch computing system, multiple jobs are submitted into the cluster for execution. These jobs will read some number of files from a shared file-system and write other files back to the shared file-system.

A problem occurs when multiple jobs accidentally read and write the same file without proper synchronization. This situation generates a race condition in the file system and the results of the jobs become ambiguous. Another problem occurs when users or applications change the files while the jobs are still executing. In some instances, the end result of the completed job does not include the change. This situation occurs when a user changes or updates a file that has already been read during execution of the job.

As one solution to these problems, users inspect the final output of the jobs. If some portion of the completed job does not look accurate, then the jobs are manually resubmitted. Manually inspecting the jobs relies on a person noticing that something about the completed job does not look right. This process is time-consuming, and users may not notice all inaccuracies.

DETAILED DESCRIPTION

Embodiments are directed to apparatus, systems, and methods to manage execution of jobs in shared file systems used by batch clusters. Exemplary embodiments utilize warnings and restart-based consistency to ensure jobs (reads and writes) are accurately performed in the file system.

Exemplary embodiments ensure execution consistency so multiple jobs do not accidentally read and write the same file without proper synchronization. As such, race conditions and job ambiguity due to improper synchronization are avoided.

Exemplary embodiments also ensure that changes to an input file do not occur while a job is still executing. If a change to an input file occurs while the job is still executing, then the client is notified and the job is automatically restarted. For instance if a user or application changes an input file while a job is still executing, the job is restarted if the end result of the completed job would not include the change. This situation occurs when a user changes or updates an input file that has already been read while the job was executing.

In one embodiment, jobs are sent to a batch cluster or batch computing system utilizing a shared file-system for storage. These jobs read some number of files from a shared file-system and write other files back to the shared file-system. Usually the jobs are restartable so that if the node or storage device they are running on fails, the batch system will automatically re-run the job. Some of the output files are recalculated when this failure occurs, while other files are not. Jobs can also have re-startable sub-portions. For example, an individual job includes a series of steps that not only work on the shared filesystem, but also on the nodes of the local filesystem. In some instance, dependencies exist between jobs in the batch system such that job B will not start until job A completes. Usually this dependency occurs because job B is going to read a file that job A produces.

Figure 1:
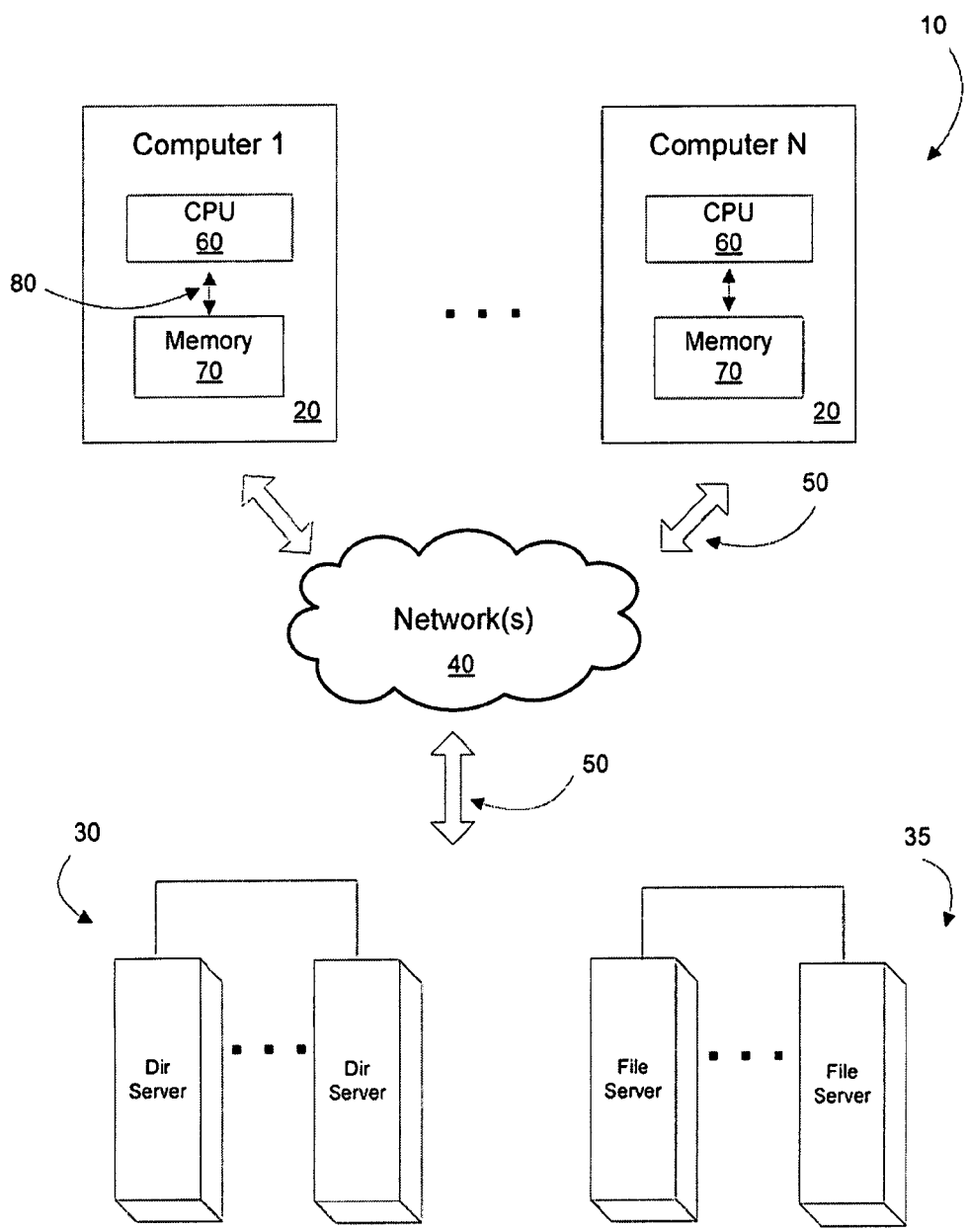
FIG. 1 is a block diagram of a storage system in accordance with an exemplary embodiment.

FIG. 1 illustrates an exemplary storage or batch computing network or system 10 utilizing embodiments in accordance with the invention. The system 10 includes one or more computers 20 (such as client or host computers or workstations, shown as computer 1 through computer N) connected to one or more directory and/or cache servers 30 (shown as directory server 1 through directory server N) and one or more origin or file servers 35 (shown as file server 1 through file server N).

The computers 20 and servers 30/35 communicate through one or more networks 40 along communication paths 50. By way of example, networks 40 include one or more of the Ethernet, fibre channel (FC), serial attached SCSI (SAS), iSCSI, Internet, local area network (LAN), wide area network (WAN), peer-to-peer (P2P), public and/or private networks, etc.

The computers 20 comprise a processing unit 60 (such as one or more processors or central processing units, CPUs) for controlling the overall operation of memory 70 (such as random access memory (RAM) for temporary data storage and read only memory (ROM) for permanent data storage). The memory 70 stores data, applications, daemons, control programs, and other data associate with computers 20. The processing unit 60 communicates with memory 60 and many other components via buses 80.

Embodiments in accordance with the present invention are not limited to any particular type or number of computers, servers, or computer systems. These devices, for example, include various portable and non-portable computers and/or electronic devices, such as servers, main frame computers, distributed computing devices, laptops, and other electronic devices and systems whether such devices and systems are portable or non-portable.

In one exemplary embodiment, the computers 20 (such as client computers) initiate jobs, and those jobs include reads or writes to and from the file servers. File accesses for the job are intercepted before going to the origin server. A notification of the access is sent through the directory servers 30. The directory servers perform a multitude of task including, but not limited to, tracking I/Os (reads and writes) to the file system, tracking input and output for jobs executed on nodes and storage devices, tracking and storing locations of chunks of files and metadata stored in client nodes, detecting when multiple jobs read and/or write to a same file without synchronization, detecting changes to files while jobs are still executing, detecting input changes to earlier jobs in a batch system dependency group, notifying clients with invalidating messages for jobs, and automatically restarting jobs. The directory servers ensure execution consistency and accurate job execution in situations when multiple jobs accidentally read and write the same file without proper synchronization or when changes to a file occur while a job is still executing. An example of improper synchronization includes job A and job B starting at the same time: Job A reading File 1, job B writing File 1, and then job A and job B finishing. An example of proper synchronization includes: Job B starting, job B writing File 1, and then job B finishing; job A starting, job A reading file 1, and then job A finishing.

The origin or file servers 35 store millions of files or terabytes of data and can be geographically located proximate to or away from the client computers (example, the file servers are located in a data center). By way of example, in one embodiment, the file servers include or are coupled to storage devices that are physically located in a same data center. In another embodiment, the storage devices are located a great geographical distance apart in separate data centers. Further, although only two storage devices are shown, an embodiment can include hundreds or thousands of such storage devices.

Figure 2:
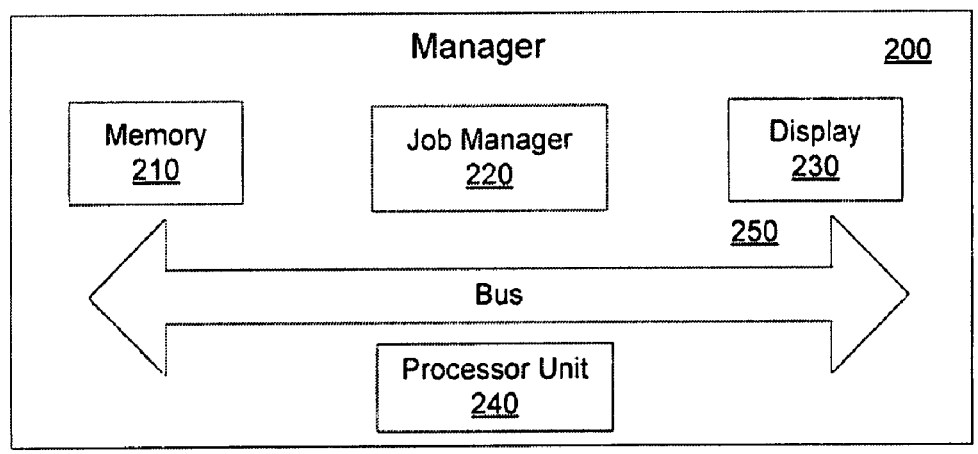
FIG. 2 is a block diagram of a job manager in accordance with an exemplary embodiment.

FIG. 2 is a block diagram of a manager 200 in accordance with an exemplary embodiment of the present invention. In one embodiment, the manager is a computer that includes memory 210, job management software or algorithms 220, display 230 (optional), processing unit 240 and one or more buses 250.

In one embodiment, the processor unit includes a processor (such as a central processing unit, CPU, microprocessor, application-specific integrated circuit (ASIC), etc.) for controlling the overall operation of memory 210 (such as random access memory (RAM) for temporary data storage, read only memory (ROM) for permanent data storage, and firmware). The processing unit 240 communicates with memory 210 and display 230 via one or more buses 250 and performs operations and tasks necessary to manage the various data storage and data retrieval requests received from computers 20. The memory 210, for example, stores applications, data, programs, algorithms (including software to implement or assist in implementing embodiments in accordance with the present invention) and other data.

In one exemplary embodiment, the manager functions as a directory server. The manager manages execution of jobs in batch clusters using file systems and utilizes warnings and restart-based consistency to ensure jobs (reads and writes) are accurately performed in the file system.

Figure 3:
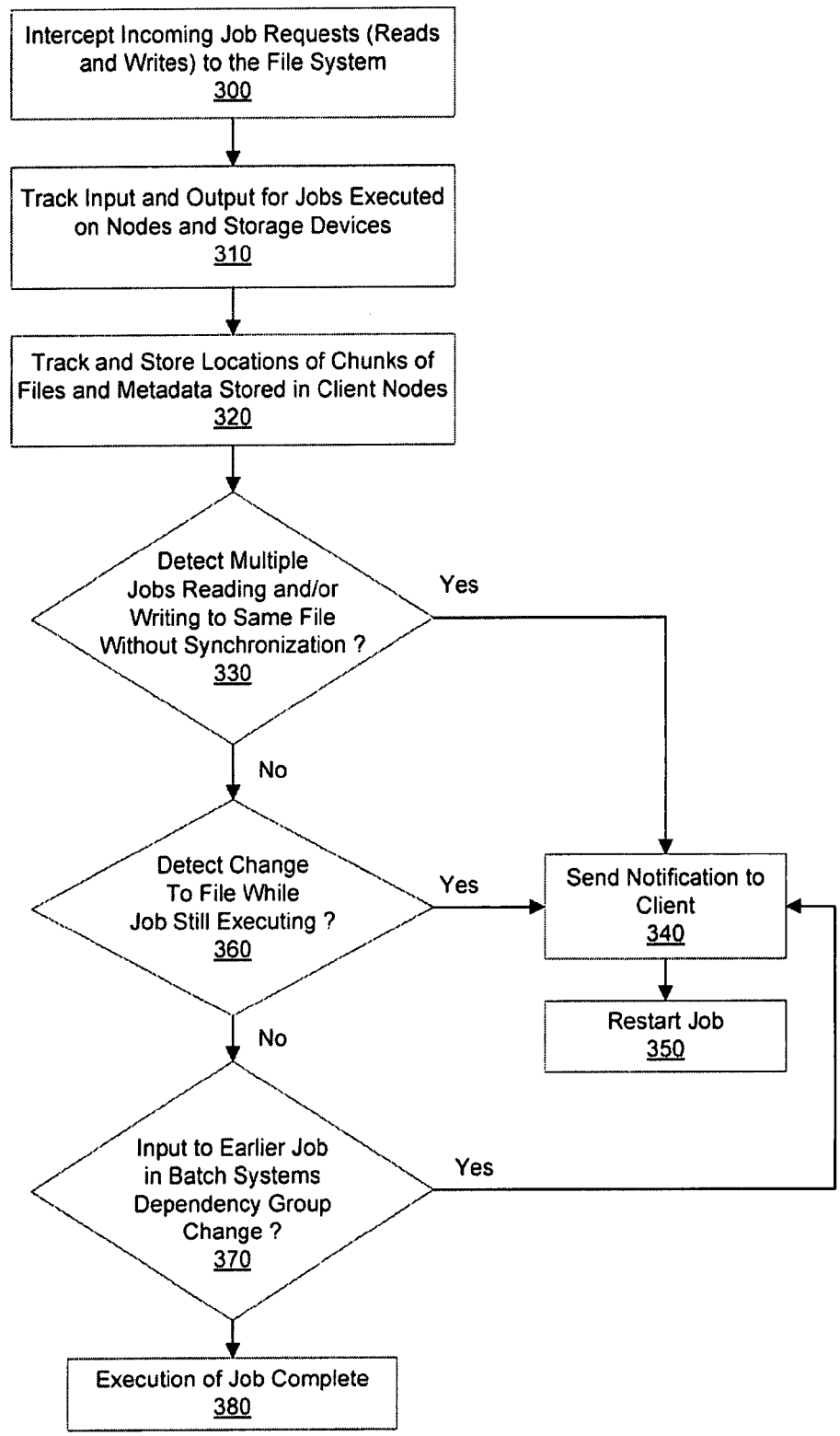
FIG. 3 is a flow diagram for managing execution of jobs in shared file systems in accordance with an exemplary embodiment.

FIG. 3 is a flow diagram in accordance with an exemplary embodiment for managing execution of jobs in shared file systems and ensuring jobs are accurately executed.

According to block 300, the directory server or manager intercepts or monitors incoming I/O requests (for example, reads and writes) to the file system. In one embodiment, the manager intercepts all read and write requests to the shared file system and the local file system as well.

Various apparatus and methods can be used to intercept or track incoming job requests. By way of example, one embodiment uses a module that functions like a file system. Applications executing on the client are configured to perform all of their reads and writes through that sub-portion of the file system. In particular, for every job that is executed on the node, the manager tracks every input and output. Moreover, the manager knows the identification of each process so each read and write is associated and tracked with a particular batch job.

According to block 310, the manager tracks input and output for jobs executed on nodes and storage devices. Further, according to block 320, the manager tracks and stores locations of chunks of files and metadata stored in client nodes.

One exemplary embodiment includes one or more directory servers that track the location of chunks of files stored in client nodes as well as file meta-data. Tracking this information enables embodiments to recognize or detect instances when files are changed by a node that is not being tracked (for example, outside of the batch system). The directory server is dedicated to storing this information, so each directory server can store file meta-data for hundreds of millions of files in memory.

The directory server or manager is capable of detecting when multiple jobs read and/or write to a same file without proper synchronization. According to block 330, if the manager performs this detection, then flow proceeds to block 340 wherein a notification is sent to the client node or user. For instance, the directory server sends invalidate messages to clients when files are changed so that the clients know they have to re-read the files. By way of example, the client can restart the job, or the manager can automatically restart the job according to block 350. As such, race conditions and job ambiguity due to improper synchronization are avoided.

The directory server or manager is also capable of detecting when changes to a file occur while the job is still executing. According to block 360, if the manager performs this detection, then flow proceeds to block 340 wherein a notification is sent to the client node or user. For instance, the directory server sends invalidate messages to clients when files are changed so that the clients know they have to re-read the files. By way of example, the client can restart the job, or the manager can automatically restart the job according to block 350. For instance if a user changes a file while a job is still executing, the job is restarted if the end result of the completed job would not include the change from the user. This situation occurs when a user or application changes or updates a file that has already been read.

Exemplary embodiments detect situations that occur in both (1) multiple jobs accidentally reading/writing the same file without proper synchronization and (2) changes to files and underlying input while jobs are still executing. These situations are detected since the directory server has sufficient information about all the files. Further, in one embodiment, the clients ask or request the directory server which of the files that a job accessed or tried to access changed. Since the directory server stores this information in main memory, it can very efficiently answer this question. Furthermore, since the directory server transmits or sends out invalidate messages, the clients can continue to register interest in a file so long as a job is executing. As such, clients are not required to query the directory server at the end of a job to detect files that have changed since notification is immediately sent to the client from the directory server as soon the change occurs.

In one exemplary embodiment, the manager or directory server manages jobs with internal stages. If the job has internal stages, it interacts with the manager to ask the question at the intermediate points in those internal stages whether or not anything has changed (example, a file is written to). If something has changed (example, a file is altered), the manager can immediately and automatically restart the job. If in addition the internal stages notify the manager as to the start and the end of stages, then the manager can instruct or notify the job which stages need to be re-executed so as to minimize the loss. As such, the entire job is not re-executed, but only the relevant stages. This restarting can be automatically initiated by the manager. Further, these stages can be created by running the jobs in a virtual machine as the virtual machine can allow a job to be partially restarted at any point.

The directory server or manager is capable of detecting when changes occur to the input of earlier or previous jobs in batch systems dependency groups. According to block 370, if the manager performs this detection, then flow proceeds to block 340 wherein a notification is sent to the client node or user. For instance, the directory server sends invalidate messages to clients when files are changed so that the clients know they have to re-read the files. By way of example, the client can restart or re-execute the job, or the manager can automatically restart or re-execute the job according to block 350.

According to block 380, execution of the job is successfully completed.

Thus, the manager can detect that the inputs to an earlier job in the batch systems dependency group have changed, and even re-submit jobs that have already finished. This situation is primarily useful when users change the files while some of the group of related jobs are still executing. Alternately, a user can be notified and allowed to determine whether the job should be restarted.

One exemplary embodiment uses lifetime analysis so that the manager can notice that a file was written by a job, read later, and then written by a different job. Provided the first job does not read the file again, the manager can conclude that multiple jobs read and write the same file without proper synchronization. In other words, the manager detects the occurrence of a race condition and determines that the first job does not need to be re-executed because it read consistent data. Further, in one embodiment, the manager decides to artificially add in serialization into the execution if it detects (via the lifetime analysis) that simultaneous execution of the jobs will not be successful.

In one embodiment, the manager stores checksums of the data provided to applications. The manager then prunes the information about what needs to be re-executed on the basis that the returned data would be the same. This situation assists where the user or another application happens to write the same data again, for example because it incorrectly believes the data needs to be recalculated.

In many cases, these problems can be solved in different ways. In particular, some of the problems can be solved by running the equivalent of a trace on the jobs, logging the files that are accessed, and then running a post-analysis over the logs to determine whether the jobs need to be re-executed. This solution would not be able to handle the early restarts described above using interest in files. Similarly, if a modification is made to the underlying distributed file system to generate the logs, such a modified embodiment can handle both the post-analysis and the early restart (but would not be able to implement the dynamic race elimination portion of discussed exemplary embodiments). The post-analysis additionally can suggest locking that needs to be added to the jobs to achieve conflict-free execution. The post-analysis can further, if so desired, add the necessarily locking automatically.

Exemplary embodiments thus enable a manager or directory server to automatically restart jobs after input files have changed on them. Partial restart of jobs with dependencies can also occur. Further, as noted, exemplary embodiments enable file usage lifetime analysis in order to serialize and lock re-executions of jobs. Exemplary embodiments also track checksums to determine that re-execution does not actually need to happen.

As used herein, the term "storage device" means any data storage device capable of storing data including, but not limited to, one or more of a disk array, a disk drive, a tape drive, optical drive, a SCSI device, or a fiber channel device. As used herein, a "disk array" or "array" is a storage system that includes plural disk drive, a cache, and controller. Arrays include, but are not limited to, networked attached storage (NAS) arrays, modular SAN arrays, monolithic SAN arrays, utility SAN arrays, and storage virtualization.

Exemplary embodiments utilize one or more computer clusters (such as servers shown in FIG. 1). As used herein, a "computer cluster" is a group of tightly coupled computers that work together closely so that in many respects the group of computers appears as though they are a single computer. The components of a cluster are commonly, but not always, connected to each other through fast local area networks. Clusters are usually deployed to improve performance and/or availability over that provided by a single computer and can be more cost-effective than single computers of comparable speed or availability.

Exemplary embodiments utilize batch processing (such as the servers in FIG. 1). As used herein, "batch processing" or "batch computing" is the execution of a series of programs ("jobs") on a computer without human interaction. Batch jobs are executed to completion without human interaction, so all input data is preselected through scripts or command line parameters. This is in contrast to interactive programs which prompt the user for such input. Batch processing has several benefits, such as one or more of: allowing sharing of computer resources among many users, shifting the time of job processing to when the computing resources are less busy, avoiding idling the computing resources without minute-by-minute human interaction and supervision, and using expensive classes of computers to help amortize the cost by keeping high rates of utilization of those expensive resources. By way of example, batch processing is used for printing, efficient bulk database updates, and automated transaction processing, as contrasted to interactive online transaction processing (OLTP) applications.

As used herein, a "filesystem" or "file system" is a system that an operating system or program uses to organize and keep track of files. A file system stores and organizes computer files so the files and corresponding data can be managed and discovered. File systems use a data storage device (such as a hard disk, CD-ROM, etc.) and manage the physical location of the files. A file system is a set of abstract data types that are implemented for the storage, hierarchical organization, manipulation, navigation, access, and retrieval of data.

Exemplary embodiments are used with both synchronous, asynchronous file systems, variations of synchronous and asynchronous file systems, and other types of file systems. Some synchronous file systems block the calling application until modifications are committed to the storage device. Data is not lost in an operating system crash or power failure since the calling application is blocked until the I/O completes. By contrast, asynchronous file systems do not block the calling application so modifications are committed to the storage device after the call completes.

Exemplary embodiments enable processing sets of jobs or batch jobs. The batch jobs are executed in one or more storage clusters in a shared or distributed file system. The jobs are managed through one or more managers or directory servers.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
monitoring, by a server, file accesses of multiple jobs that execute read and write operations to a storage device in a batch computing system that utilizes a shared file-system for storing data at the storage device;
detecting, by the server, when the multiple jobs read and write a same file at the storage device without synchronization;
monitoring which files associated with a job of multiple jobs in the batch computing system changes while executing the job, wherein the job has internal stages;
determining at each of the internal stages which files in the batch computing system changes while executing the internal stages of the job;
determining, by the server, a stage of the internal stages at which the job was executing when the multiple jobs read and write the same file;
automatically restarting, by the server and in response to detecting that the multiple jobs read and write the same file, the job in order to avoid a race condition, wherein the job is restarted at the determined stage so an entirety of the job is not re-executed.

2. The method of claim 1 further comprising: tracking locations of chunks of files and metadata stored in a client to detect at a directory server when files are altered outside of the batch computing system.

3. The method of claim 1, wherein the server is a directory server in the batch computing system.

4. A non-transitory computer readable medium having instructions for causing a computer to execute a method, comprising:
running multiple jobs in a virtual machine, wherein each job of the multiple jobs executes in multiple stages and executes read and write operations to a storage device in a batch computing system that utilizes a shared file-system for storing data at the storage device;
monitoring file accesses of multiple jobs;
detecting when the multiple jobs read and write a same file at the storage device without synchronization;
monitoring which files associated with a job of multiple jobs in the batch computing system changes while executing the job,
determining at each of the multiple stages which files in the batch computing system changes while executing the multiple stages of the job;
wherein a user or an application changes the file at one of the multiple stages;
automatically rolling back the virtual machine to the one of the multiple stages in order to partially restart the job before a race condition occurs.

5. The non-transitory computer readable medium of claim 4 wherein the method further includes:
detecting when inputs to previously executed jobs in a batch systems dependency groups have changed; and
re-executing the previously executed jobs.

6. The non-transitory computer readable medium of claim 4 wherein the method further includes:
detecting when a subsequent job writes to the file to cause a race condition; and
re-executing the job when the job reads inconsistent data.

7. The non-transitory computer readable medium of claim 4 wherein the method further includes:
storing checksums of data provided to an application executing on a client; and
using the checksums of data to determine whether the job should be re-executed due to an inaccurate data read while the job executed.

8. The non-transitory computer readable medium of claim 4 wherein the method further includes:
tracking a range of time that a file is in use by the job; and
inserting delays into execution of the job to avoid a race condition.

9. A storage system comprising:
memory storing an algorithm;
processor executing the algorithm to:
intercept multiple jobs from a client to a storage device, wherein each job of the multiple jobs executes in multiple stages and executes read and write operations to the storage device in a batch computing system that utilizes a shared file-system for storing data at the storage device;
monitor file accesses of the multiple jobs;
detect when the multiple jobs read and write a same file at the storage device without synchronization;
monitor which files associated with a job of multiple jobs in the batch computing system changes while executing the job,
determine at each of the multiple stages which files in the batch computing system changes while executing the multiple stages of the job;
determine at which of one of the multiple stages the file associated with the job changed after the file was already read to execute the job;
automatically restart the job to avoid an inaccurate data read caused by changes to the files associated with the job, wherein the job is restarted at the one of the multiple stages so an entirety of the job is not re-executed.

10. The storage system of claim 9, wherein the processor further executes the algorithm to track metadata and locations of chunks of files stored in a client to detect when files are changed outside of the shared file system.

11. The storage system of claim 9, wherein the processor further executes the algorithm to send an invalidate message to a client to inform the client to re-read the file.

12. The storage system of claim 9, wherein the processor further executes the algorithm to track checksums of read and written data to determine that a write did not change the data.

* * * * *